US012003955B2

(12) United States Patent
Son et al.

(10) Patent No.: US 12,003,955 B2
(45) Date of Patent: Jun. 4, 2024

(54) DISPLAY APPARATUS AND CONTROL METHOD THEREOF

(71) Applicant: SAMSUNG ELECTRONICS CO., LTD., Suwon-si (KR)

(72) Inventors: Sungha Son, Suwon-si (KR); Sangchul Ko, Suwon-si (KR); Jinman Kim, Suwon-si (KR); Youngsang Lee, Suwon-si (KR); Sungjoo Kim, Suwon-si (KR); Jongbae Kim, Suwon-si (KR); Dongkyu Park, Suwon-si (KR); Donghyun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 213 days.

(21) Appl. No.: 17/573,183

(22) Filed: Jan. 11, 2022

(65) Prior Publication Data

US 2022/0174450 A1 Jun. 2, 2022

Related U.S. Application Data

(63) Continuation of application No. PCT/KR2021/017238, filed on Nov. 23, 2021.

(30) Foreign Application Priority Data

Dec. 1, 2020 (KR) ........................ 10-2020-0165465

(51) Int. Cl.
*H04S 7/00* (2006.01)
*H04R 5/02* (2006.01)

(52) U.S. Cl.
CPC .............. *H04S 7/307* (2013.01); *H04S 7/303* (2013.01); *H04S 2400/01* (2013.01); *H04S 2400/05* (2013.01)

(58) Field of Classification Search
None
See application file for complete search history.

(56) References Cited

U.S. PATENT DOCUMENTS 8,204,614 B2 * 6/2012 Yamashita ................ H04S 3/02 381/98
9,813,813 B2 11/2017 Pierfelice et al.
(Continued)

FOREIGN PATENT DOCUMENTS

JP 2000-069379 3/2000
JP 2013-110585 6/2013
(Continued)

OTHER PUBLICATIONS

Sweetwater, "Should I Use Graphic or Parametric EQ?". https://www.sweetwater.com/insync/should-i-use-graphic-or-parametric-eq/ Jul. 27, 2015 (Year: 2015).*
(Continued)

*Primary Examiner* — Qin Zhu
(74) *Attorney, Agent, or Firm* — Nixon & Vanderhye, P.C.

(57) ABSTRACT

A display apparatus and a method for controlling the display apparatus are disclosed. The display apparatus includes: a communication interface comprising communication circuitry, a display, a plurality of speakers, and a processor, and the processor is configured to: control the communication interface to receive an acoustic content corresponding to a sound signal of a plurality of channels corresponding to a specified frequency bandwidth, extend a frequency bandwidth of at least one channel of the plurality of channels based on a specified parametric equalizer (PEQ), perform correction of reducing a gain in middle frequency and high frequency bands of at least one channel of the plurality of channels with the extended frequency bandwidth, and output each sound signal of the plurality of corrected channels to (Continued)

the plurality of corresponding speakers so that a sound image of the sound signal is formed in a center area of the display.

20 Claims, 17 Drawing Sheets

(56) References Cited

U.S. PATENT DOCUMENTS

| | | | | |
|---|---|---|---|---|
| 10,075,789 | B2 | 9/2018 | Stein et al. | |
| 10,421,422 | B2 | 9/2019 | Choi et al. | |
| 11,006,210 | B2 | 5/2021 | Ko et al. | |
| 11,032,646 | B2 | 6/2021 | Walther et al. | |
| 2005/0157891 | A1 | 7/2005 | Johansen | |
| 2008/0269930 | A1* | 10/2008 | Yamashita | H04R 5/04 704/E19.018 |
| 2010/0222904 | A1* | 9/2010 | Yamashita | H04S 3/02 700/94 |
| 2012/0063616 | A1* | 3/2012 | Walsh | H03G 5/025 381/103 |
| 2017/0064445 | A1 | 3/2017 | Pierfelice et al. | |
| 2018/0103319 | A1 | 4/2018 | Stein et al. | |
| 2018/0192185 | A1* | 7/2018 | Starobin | H04R 1/2892 |
| 2018/0359583 | A1 | 12/2018 | Fink | |
| 2019/0098427 | A1* | 3/2019 | Gómez-Bolaños | H04S 7/301 |
| 2019/0166419 | A1 | 5/2019 | Ko et al. | |
| 2020/0059724 | A1 | 2/2020 | Walther et al. | |
| 2021/0200264 | A1 | 7/2021 | Kim et al. | |

FOREIGN PATENT DOCUMENTS

| | | |
|---|---|---|
| JP | 2016-149767 | 8/2016 |
| JP | 6044365 | 12/2016 |
| JP | 2017-050856 | 3/2017 |
| KR | 10-2003-0056545 | 7/2003 |
| KR | 10-2005-0026928 | 3/2005 |
| KR | 10-2008-0085297 | 9/2008 |
| KR | 10-0897971 | 6/2009 |
| KR | 10-2019-0028297 | 3/2019 |
| KR | 10-2019-0062902 | 6/2019 |
| KR | 10-2021-0086124 | 7/2021 |
| KR | 10-2320279 | 11/2021 |
| KR | 10-2391744 | 4/2022 |
| WO | 2007/016527 | 2/2007 |

OTHER PUBLICATIONS

Sundown, "15 Best Parametric EQ Plugins in 2020". https://sundownsessionsstudio.com/parametric-eq-plugins/ 2020 (Year: 2020).*

Search Report and Written Opinion dated Mar. 8, 2022 in counterpart International Patent Application No. PCT/KR2021/017238.

* cited by examiner

DISPLAY APPARATUS AND CONTROL METHOD THEREOF

CROSS-REFERENCE TO RELATED APPLICATIONS

This application is a continuation of International Application No. PCT/KR2021/017238 designating the United States, filed on Nov. 23, 2021, in the Korean Intellectual Property Receiving Office and claiming priority to Korean Patent Application No. 10-2020-0165465, filed on Dec. 1, 2020, in the Korean Intellectual Property Office, the disclosures of which are incorporated by reference herein in their entireties.

BACKGROUND

1. Field

The disclosure relates to a display apparatus and a control method thereof and for example to a display apparatus that uses a speaker included in the display apparatus as a center speaker in association with an external audio system and a control method thereof.

2. Description of Related Art

The display apparatus generally receives AV contents including an image content and an acoustic content, outputs the image content through a display, and outputs the acoustic content through the speaker. Generally, the display apparatus may include a plurality of speakers. The display apparatus may output a sound signal of the acoustic content from a low frequency band to a high frequency band through each of the plurality of speakers.

In recent years, various electronic apparatuses are developed and a plurality of electronic apparatuses may operate in association. For example, an external audio system may be connected to the display apparatus to output the sound signal of the acoustic content together with the speaker of the display apparatus. In this case, the speaker of the display apparatus may operate as a center speaker of the external audio system. In a case where the speaker of the display apparatus operates as the center speaker and processes and outputs a sound signal in the same manner as in the normal case, the sound signal output to the speaker of the display apparatus may cause a problem in relationship with a sound signal output to the external audio system.

For example, the sound signal output to the display apparatus which operates as the center speaker may cause a problem regarding frequency characteristics correction between speakers, a problem regarding center sound image localization, and a problem regarding matching between sound signals.

When the speaker of the display apparatus operates as the center speaker, in the related art, the display apparatus may divide a frequency band of the sound signal of the acoustic content and output to each speaker. In this case, a speaker which outputs a sound signal of a band other than the frequency band necessary for the center speaker, or a speaker which outputs only a part of a reproduction band may cause negative effect on the entire acoustic characteristics or balance. In addition, a problem that a sound image is shifted to one direction of the display or the sound image is formed in an area other than the display may occur.

Accordingly, there is a need for a technology in that, when the speaker of the display apparatus operates as the center speaker, the sound signal output to the speaker of the display apparatus is in harmony with the sound signal output from the external audio system and the sound image is formed in a center area of the display.

SUMMARY

Embodiments of the disclosure provide a display apparatus in which, when a speaker of a display operates as a center speaker, a sound signal output to the speaker of the display apparatus is in harmony with a sound signal output from an external audio system and a sound image is formed in a center area of the display.

According to an example embodiment of the disclosure, there is provided a display apparatus including: a communication interface comprising communication circuitry, a display, a plurality of speakers, and a processor, wherein the processor is configured to: control the communication interface to receive an acoustic content corresponding to a sound signal of a plurality of channels corresponding to a specified frequency bandwidth, extend a frequency bandwidth of at least one channel of the plurality of channels based on a predetermined parametric equalizer (PEQ), perform correction of reducing a gain in middle frequency and high frequency bands of at least one channel of the plurality of channels with the extended frequency bandwidth, and output each sound signal of the plurality of corrected channels to the plurality of corresponding speakers so that a sound image of the sound signal is formed in a center area of the display.

According to an example embodiment of the disclosure, there is provided a method for controlling a display apparatus, the method including: receiving an acoustic content corresponding to a sound signal of a plurality of channels corresponding to a specified frequency bandwidth, extending a frequency bandwidth of the plurality of channels based on a predetermined parametric equalizer (PEQ), performing correction of reducing a gain in middle frequency and high frequency bands of at least one channel of the plurality of channels with the extended frequency bandwidth, and outputting each sound signal of the plurality of corrected channels to the plurality of corresponding speakers so that a sound image of the sound signal is formed in a center area of the display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
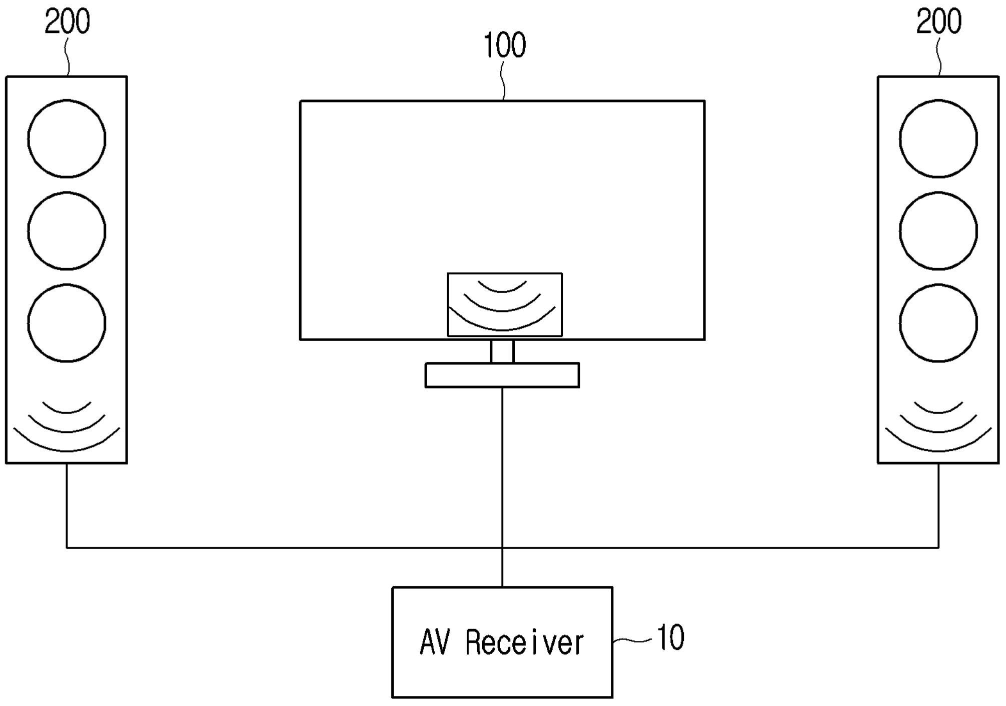
FIG. 1 is a diagram illustrating an example display apparatus which operates in a center speaker mode according to various embodiments.

Hereinafter, various example embodiments will be described in greater detail with reference to the accompanying drawings. The embodiments disclosed herein may be variously modified. A specific embodiment may be illustrated in the drawing and described in detail in the detailed description. However, the specific embodiment disclosed in the accompanying drawing is merely for ease of understanding of various embodiments. Accordingly, it should be understood that the technical spirit is not limited to any specific embodiment disclosed in the accompanying drawing, and all equivalents or alternatives included in the disclosed spirit and technical scope are included.

The terms including ordinals such as "first" or "second" may be used for describing various components, but the components are not limited by the above terms. The above terms may be used for distinguishing one component from another.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof. If it is described that a certain element is "connected to" or "coupled to" another element, it should be understood that the certain element may be connected to the other element directly or through still another element. On the other hand, if it is described that a certain element is "directly coupled to" or "directly connected to" another element, it may be understood that there is no element therebetween.

A "module" or a "unit" regarding an element used in the disclosure may perform at least one function or operation. In addition, the "module" or the "unit" may perform the function or the operation by hardware, software, or a combination of hardware and software. In addition, a plurality of "modules" or a plurality of "units", except for a "module" or a "unit" which should be performed in specific hardware or performed in at least one processor, may be integrated into one module. Unless otherwise defined specifically, a singular expression may encompass a plural expression.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps. In the disclosure, "A or B" does not only selectively indicate any one of A and B, but is defined to include both A and B. In addition, a term "including" in the disclosure may have meaning of further including other elements, in addition to the listed elements.

In the disclosure, elements necessary for the description of the disclosure are described and elements with no relation with the gist of the disclosure may not be mentioned. It should not be interpreted as including only the mentioned elements, but should be interpreted as including other elements.

In addition, in describing the disclosure, a detailed description of the related art or configuration may be omitted when it is determined that the detailed description may unnecessarily obscure a gist of the disclosure. Each embodiment may be implemented or operated independently or the embodiment may also be implemented or operated in combination.

FIG. 1 is a diagram illustrating an example display apparatus which operates in a center speaker mode according to various embodiments.

FIG. 1 illustrates a display 100, an external audio system 200, and an AV receiver 10.

The AV receiver 10 may receive an AV content including an image content and an acoustic content. The image content received from the AV receiver 10 may be transmitted to the display apparatus 100, and the display apparatus 100 may process the image signal included in the image content and display the processed image signal. For example, the display apparatus 100 may include, without limitation, a smartphone, a tablet PC, a navigation, a slate PC, a wearable device, a digital TV, a desktop computer, a laptop computer, a kiosk, or the like. The acoustic content received from the AV receiver 10 may be transmitted to only the display apparatus 100 and may be transmitted to the display apparatus 100 and the external audio system 200.

For example, when the acoustic content is transmitted to only the display apparatus 100, the display apparatus 100 may process the sound signal included in the acoustic content and output the processed sound signal through an internal speaker. The sound signal of the acoustic content may include a plurality of channels. For example, each of the plurality of channels may correspond to a low-band frequency (or low frequency band), middle-band frequency (or middle frequency band), and high-band frequency (or high frequency band), and each sound signal of the plurality of channels may be output through the inner speaker. A mode in which the sound signal included in the acoustic content is output only by the internal speaker of the display apparatus 100 may be referred to as a display mode.

In a case where the acoustic content is transmitted to the display apparatus 100 and the external audio system 200, the display apparatus 100 may process and output the sound signal included in the acoustic content in association with the external audio system 200. In this case, the internal speaker of the display apparatus 100 may perform a role of a center speaker of the external audio system 200. A mode in which the internal speaker of the display apparatus 100 operates as the center speaker when the display apparatus 100 is associated with the external audio system 200 is a center speaker mode.

When the display apparatus 100 operates in the center speaker mode, if the sound signal of the acoustic content is processed and output in the same manner as in the display mode, a problem regarding frequency characteristics or sound image matching may occur. Accordingly, in the disclosure, when the display apparatus 100 operates in the center speaker mode, a parametric equalizer (PEQ) in a new center speaker mode may be applied instead of a PEQ in the display mode. For example, the PEQ of the center speaker mode may include a delay of each of a plurality of channel sound signals, gain adjustment, application of a weight set to a predetermined frequency band, and the like.

The display apparatus 100 may include a plurality of internal speakers. The display apparatus 100 may receive the acoustic content from the AV receiver 10. The acoustic content may include sound signals of a plurality of channels corresponding to a predetermined frequency bandwidth. When the display apparatus 100 operates in the center speaker mode, the display apparatus may extend the frequency bandwidth of at least one channel among the plurality of channels based on a predetermined (e.g., specified) PEQ (e.g., center speaker mode PEQ). The display apparatus 100 may output the sound signal by setting all of the plurality of internal speakers as the center speaker with respect to the external audio system 200 by extending the frequency bandwidth. The display apparatus 100 may perform correction of reducing the gain in a medium frequency and high frequency band of the sound signal with the extended bandwidth. The display apparatus 100 may tune the sound signal of the plurality of channels based on the predetermined PEQ and output the tuned sound signal to the plurality of internal speaker corresponding to the plurality of channels. The tuned sound signal output to each of the plurality of internal speakers of the display apparatus 100 may form a sound image in a center area of the display of the display apparatus 100.

The sound image may refer to an apparent sound source that a user feels when listening the sound. In other words, the sound image may refer to a location of a virtual sound source detected by the user. For example, if a user watches an image content in which construction is in progress on the left side and an actor is having a conversation on the right side, a sound image of the construction noise may be formed on the left side of the display apparatus and a sound image of sounds of the conversation of the actor may be formed on the right side of the display apparatus. In this case, the user may listen stereophonic sound corresponding to the image content.

When the display apparatus 100 operates in the center speaker mode together with the external audio system 200, a sound image of the sound signal output to the internal speaker of the display apparatus 100 is preferably formed in the center area of the display. Accordingly, when the display apparatus 100 operates in the center speaker mode, the display apparatus 100 may form the sound image of the output sound signal in the center area of the display based on the PEQ of the center speaker mode.

Hereinafter, an example configuration of the display apparatus will be described in greater detail with reference to the drawings.

Figure 2:
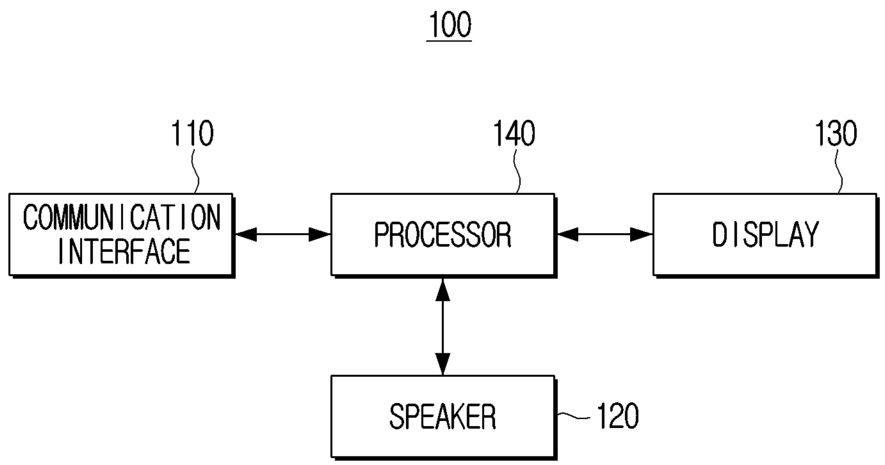
FIG. 2 is a block diagram illustrating an example configuration of the display apparatus according to various embodiments.
Figure 3:
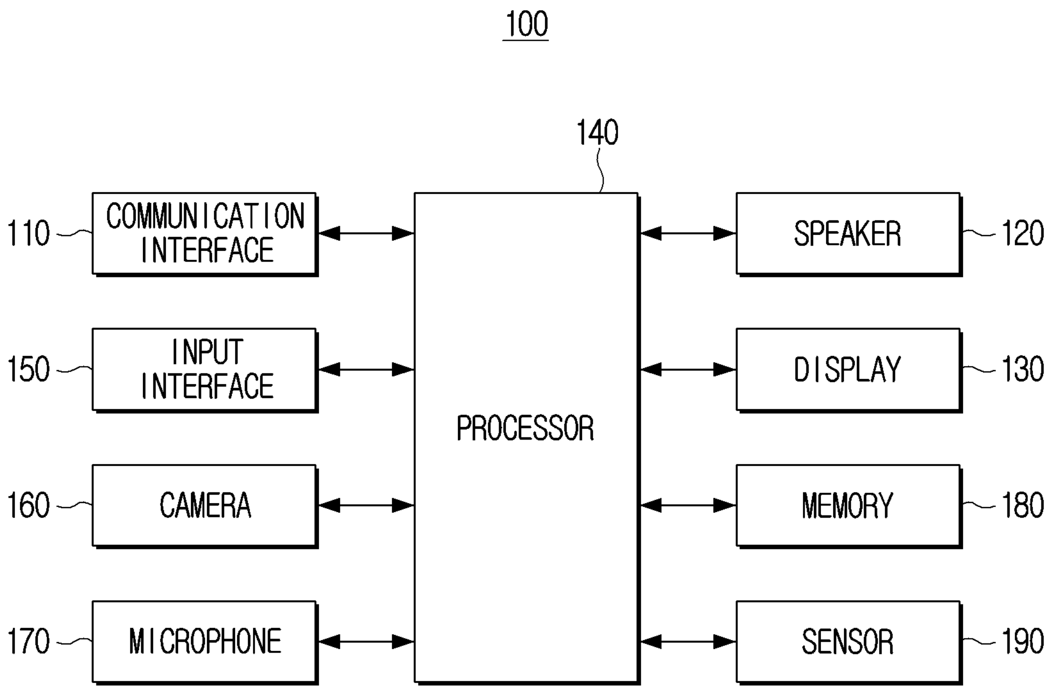
FIG. 3 is a block diagram illustrating an example configuration of the display apparatus according to various embodiments.

FIG. 2 is a block diagram illustrating an example configuration of the display apparatus according to various embodiments, and FIG. 3 is a block diagram illustrating an example configuration of the display apparatus according to various embodiments. The following description will be made with reference to FIGS. 2 and 3.

Referring to FIG. 2, the display apparatus 100 may include a communication interface (e.g., including communication circuitry) 110, a speaker 120, a display 130, and a processor (e.g., including processing circuitry) 140.

The communication interface 110 may include various communication circuitry and communicate with an external apparatus. For example, the external apparatus may include an AV receiver, a web server, a cloud, and the like. The communication interface 110 may receive the acoustic content according to control of the processor 140. The acoustic content may be included in the AV content together with the image content. For example, the communication interface 110 may include a module capable of performing communication by a method such as 3G, long term evolution (LTE), 5G, Wi-Fi, Bluetooth, digital multimedia broadcasting (DMB), advanced television systems committee (ATSC), digital video broadcasting (DVB), and local area network (LAN). In addition, the communication interface may include a global positioning system (GPS) module.

The communication interface 110 may include a communication port. Accordingly, the communication interface 110 may receive the acoustic content through the communication port. For example, the communication interface 110 may receive the acoustic content from an external apparatus (including external memory) through the communication port. For example, the communication port may include a port such as a high-definition multimedia interface (HDMI), a universal serial bus (USB), Thunderbolt, LAN, or the like. The communication interface which communicates with the external apparatus may be referred to, for example, as a communicator, a communication module, a transceiver, or the like.

The speaker 120 may output the sound signal subjected to sound processing. In an embodiment, the display apparatus 100 may include a plurality of speakers. In addition, the acoustic content may include the sound signal of the plurality of channels. Each of the plurality of speakers may output the corresponding sound signal of the plurality of channels. In addition, the speaker 120 may output an input command of the user, and state related information, operation related information, or the like of the display apparatus 100 as a voice or an alarm.

The display apparatus 100 may include the plurality of speakers 120. In an embodiment, the plurality of speakers 120 may be disposed in at least one area of a left area, a center area, and a right area of the display apparatus 100. For example, the left area may include an upper left area, a middle left area, and a lower left area of the display apparatus 100. The center area may include a center upper area and a center lower area of the display apparatus 100. In addition, the right area may include an upper right area, a middle right area, and a lower right area of the display apparatus 100.

The display 130 may output the image signal subjected to the image processing. For example, the display 130 may be implemented, for example, and without limitation, as a liquid crystal display (LCD), an organic light emitting diode (OLED), a flexible display, a touch screen, or the like. When the display 130 is implemented as a touch screen, the display apparatus 100 may receive a control command through the touch screen.

The processor 140 may include various processing circuitry and control each configuration of the display apparatus 100. For example, the processor 140 may control the communication interface 110 to receive the AV content. The processor 140 may process the image signal included in the AV content and control the display 130 to output the image signal subjected to the image processing. In addition, the processor 140 may process the sound signal included in the AV content and control the speaker 120 to output the sound signal subjected to the sound processing.

The sound signal may include a plurality of channels. When the display apparatus 100 operates in the center speaker mode, the processor 140 may extend a frequency bandwidth of at least one channel based on the PEQ for center speaker mode. For example, generally, each sound signal of the plurality of channels may be a signal of a low band frequency band, a signal of a middle band frequency band, or a signal of a high band frequency band. The processor 140 may convert the sound signal of the plurality of channels into a sound signal in similar bands to operate all speakers 120 of the display apparatus 100 as the center speaker.

In addition, the processor 140 may perform correction of reducing the gain of the middle frequency and high frequency bands of at least one channel among the plurality of channels with the extended frequency bandwidth. As described above, in a case of extending the bandwidth of the sound signal of the plurality of channels, the sound signals of the middle frequency and high frequency bands may overlap to cause unbalancing of the output sound signals. Accordingly, the processor 140 may reduce the gain of the sound signal of the middle frequency and high frequency band to maintain the balance of the output sound signals.

The processor 140 may apply the PEQ for the center speaker mode so that the sound image is formed in the center area of the display area based on a location of the speaker, a location of the user, and the like. In addition, the processor 140 may control the speaker 120 to output each of the sound signals of the plurality of channels to the plurality of corresponding speakers. For example, the PEQ for the center speaker mode may include functions of a delay of each sound signal of the plurality of channels, the gain adjustment, and application of a weight set to a predetermined frequency band (or set value).

As described above, the display apparatus 100 may include the plurality of speakers 120. When the center speaker is disposed in the center area of the display apparatus 100, the processor 140 may output the sound signal by increasing the gain of the sound signal of the channel output to the center speaker to be greater than the sound signal of the channel output to the speaker disposed in other areas based on the PEQ for the center speaker, thereby minimizing or reducing the change of the location of the sound image according to the location of the user.

In addition, when the speakers 120 are disposed in the lower area and the upper area of the display apparatus 100, the processor 140 may output the sound signal by delaying the sound signal of the channel output to the speaker disposed in the lower area based on the PEQ for the center speaker. Accordingly, the sound image of the sound signal may be formed in the center area of the display 130. The processor 140 may output the sound signal by increasing the gain of the sound signal of the channel output to the speaker disposed in the upper area. Accordingly, the sound image of the sound signal may be formed in the center area of the display 130. The processor 140 may output the sound signal by applying the weight set to the high frequency band of the channel output to the speaker disposed in the upper area. Accordingly, the sound image of the sound signal may be formed in the center area of the display 130.

In addition, when the speaker is disposed in the lower area and the upper area of the display apparatus 100, the processor 140 may output the sound signal by applying the weight set to the middle frequency and high frequency band of the channel output to the speaker disposed in the upper area based on the PEQ for the center speaker. Accordingly, it is possible to prevent and/or reduce a deterioration of the output sound signal in the middle frequency and high frequency band.

Referring to FIG. 3, the display apparatus 100 may further include an input interface (e.g., including input circuitry) 150, a camera 160, a microphone 170, a memory 180, and a sensor 190, in addition to the communication interface 110, the speaker 120, the display 130, and the processor 140.

The input interface 150 may include various input circuitry and receive a control command from the user. For example, the input interface 150 may be implemented as a key pad, a touch pad, or the like. The input interface 150 may perform a function of receiving a command from the user and may be referred to as an inputter or an input module.

The input interface 150 may be implemented as the display 130, the camera 160, the microphone 170, or the sensor 190 in addition to the key pad or the touch pad described above. For example, if the display 130 is implemented as a touch screen, the display apparatus 100 may receive the control command through the touch screen. If the input interface 150 is implemented as the camera 160, the display apparatus 100 may capture a face or a motion of the user. The processor 140 may recognize the control command based on the captured face or motion. If the input interface 150 is implemented as the microphone 170, the display apparatus 100 may receive a user's voice. The processor 140 may recognize the control command based on the input voice. If the input interface 150 is implemented as the sensor 190, the sensor 190 may receive a motion of the user or a signal from an external apparatus such as a remote control. The processor 140 may recognize the control command based on the motion of the user or the signal.

The camera 150 may capture a surrounding environment including the user. The processor 140 may identify a location of the user based on the captured image.

The microphone 170 may receive an audio signal. In an embodiment, the display apparatus 100 may include a plurality of microphones. The plurality of microphones may be disposed in an upper area, a lower area, a front surface area, a rear surface area, a camera arrangement area, and the like of the display apparatus 100. At least one microphone among the plurality of microphones may be a directional microphone. The microphone 170 may obtain the audio signal from the user who is located within a predetermined distance according to the control of the processor 140. In addition, if the display apparatus 100 includes the plurality of microphones, the processor 140 may identify the location of the user based on a direction, a size, a phase, and the like of the audio signal obtained from the plurality of microphones.

The memory 180 may store data and algorithm for performing the function of the display apparatus 100 and store a program, a command, and the like operated in the display apparatus 100. In addition, the memory 180 may store the PEQ for the display mode and the PEQ for the center speaker mode. The algorithm stored in the memory 180 may be loaded in the processor 140 according to the control of the processor 140 and perform image signal processing and sound signal processing. For example, the memory 180 may be implemented as a type of a ROM, a RAM, an HDD, an SSD, a memory card, or the like.

The sensor 190 may detect the user around the display apparatus 100. For example, the sensor 190 may include, for example, and without limitation, an image sensor, a motion recognition sensor, a proximity sensor, a heat detection sensor, a touch sensor, an infrared sensor, an ultrasonic sensor, and the like. If the processor 140 confirms the location of the user based on the information obtained through the camera 160 and the microphone 170, the camera 160 or the microphone 170 may be considered as a type of the sensor 190.

When the processor 140 identifies the location of the user using the sensor 190, the processor 140 may correct the area in which the sound image is formed. As described above, the sound image may refer to a location of the virtual sound source detected by the user. Accordingly, if the user is located in the center area of the display apparatus 100, the location of the sound image formed in the center area of the display 130 may change, if the user moves. Accordingly, the processor 140 may correct the area in which the sound image is formed based on the identified location of the user.

For example, the processor 140 may output the sound signal by delaying the sound signal of the channel output to the speaker disposed in an area corresponding to the location of the user among the left area and the right area of the display apparatus 100. Accordingly, the sound image of the sound signal may be formed in an area opposite to the area in which the speaker, to which the delayed sound signal is output, is located. However, the user located in one direction may recognize that the sound image is still formed in the center area of the display 130. In other words, the processor 140 may correct the area in which the sound image of the sound signal is formed based on the center area of the display 130.

The processor 140 may output the sound signal by increasing the gain of the sound signal of the channel output to the speaker disposed in an area farthest away from the detected location of the user. Accordingly, the sound image of the sound signal may be formed in an area in which the speaker, to which the sound signal with the increased gain is output, is located based on the center area of the display 130. However, the user located in one direction may recognize that the sound image is still formed in the center area of the display 130. In other words, the processor 140 may correct the area in which the sound image of the sound signal is formed based on the center area of the display 130.

The processor 140 may output the sound signal by applying the weight set to the high frequency band of the channel output to the speaker disposed in the area farthest away from the detected location of the user. Accordingly, the sound image of the sound signal may be formed in an area where the speaker to which the sound signal with the applied weight is output is located based on the center area of the display 130. However, the user located in one direction may recognize that the sound image is still formed in the center area of the display 130. In other words, the processor 140 may correct the area in which the sound image of the sound signal is formed based on the center area of the display 130.

The display apparatus 100 may include all of the elements described above and may include some of the elements. In addition, the display apparatus 100 may further include other elements performing various functions in addition to the elements described above.

Figure 4:
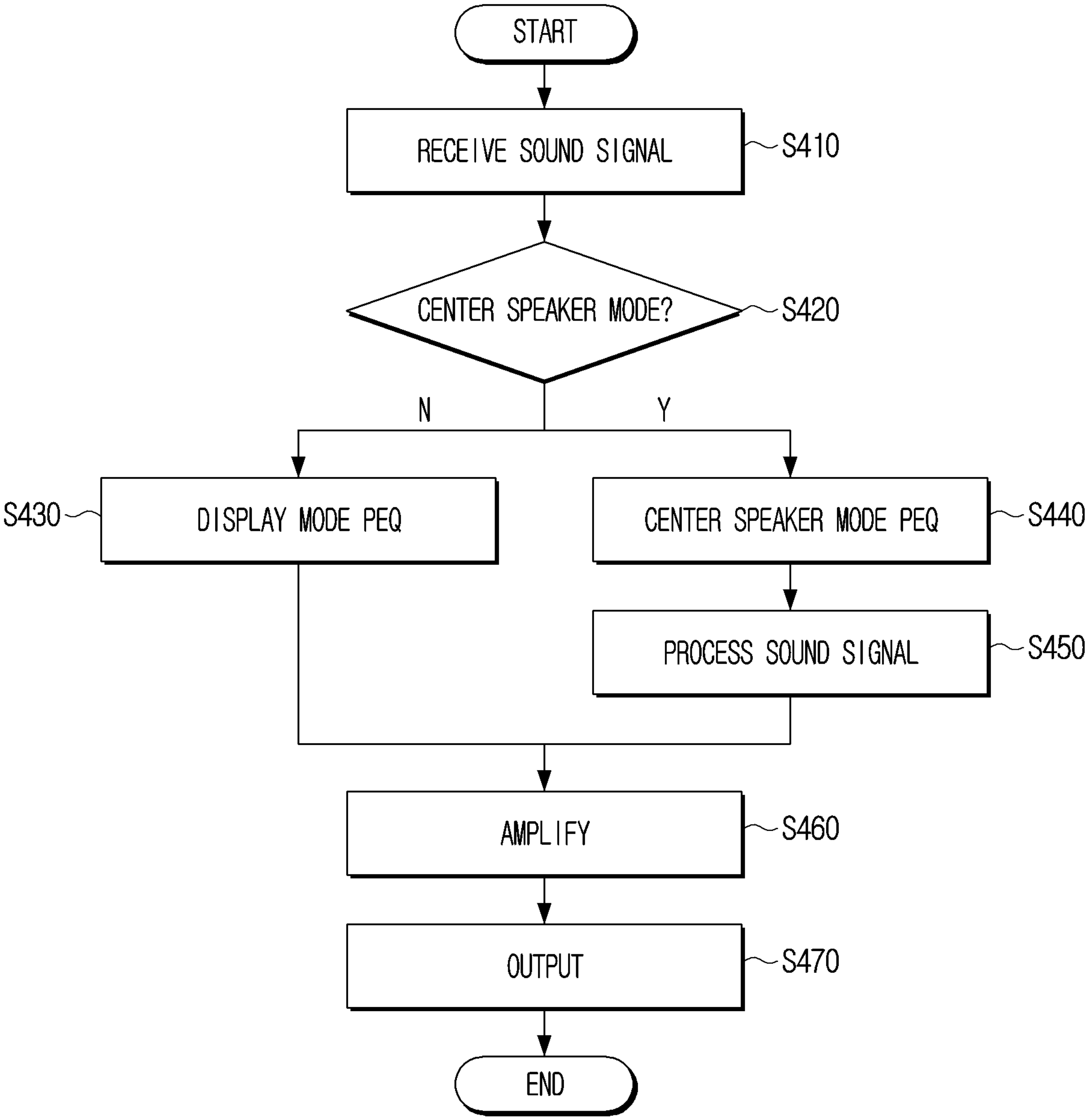
FIG. 4 is a flowchart illustrating an example operation of the display apparatus according to each mode according to various embodiments.

FIG. 4 is a flowchart illustrating an example operation of the display apparatus according to each mode according to various embodiments.

Referring to FIG. 4, the display apparatus may receive a sound signal (S410). The display apparatus may receive an AV content from an external apparatus and the AV content may include an image signal and a sound signal. The display apparatus may select a display mode or a center speaker mode (S420). For example, the display apparatus may select a mode according to the selection of the user and select the mode according to the type of the received AV content.

When the display apparatus does not operate in the center speaker mode, that is, when the display apparatus operates in the display mode, the PEQ for the display mode may be applied to the sound signal (S430). The display mode may refer to a mode in which the sound signal is output through the internal speaker of the display apparatus. When the display apparatus operates in the center speaker mode, the PEQ for the center speaker mode may be applied (S440) and the sound signal may be processed (S450). When the display apparatus operates in association with the audio system, the internal speaker of the display apparatus may output the sound signal of a center channel. The multi-channel sound signals received by the display apparatus needs to be input to all speakers of the display apparatus in the same manner. Accordingly, it is necessary to provide the PEQ for the center speaker mode which is different from the PEQ for the display mode, and the display apparatus needs to process the sound signal by a method with a set value which are different from those in the display mode. For example, the display apparatus in the center speaker mode may extend a frequency bandwidth of at least one channel among a plurality of channels based on the PEQ for the center speaker mode. The display apparatus may perform correction of reducing the gain of the middle frequency and high frequency bands of at least one channel among the plurality of channels with the extended frequency bandwidth.

The display apparatus may amplify the sound signal processed by applying the PEQ for the display mode or the PEQ for the center speaker mode (S460) and output the sound signal through the speaker (S470). In other words, the display apparatus may output each sound signal subjected to the signal processing for each channel to the plurality of corresponding speakers in the display mode. The display apparatus may output each sound signal of the corrected plurality of channels so that the sound image of the sound signal is formed in the center area of the display to the plurality of corresponding speakers in the center speaker mode.

Figure 5A:
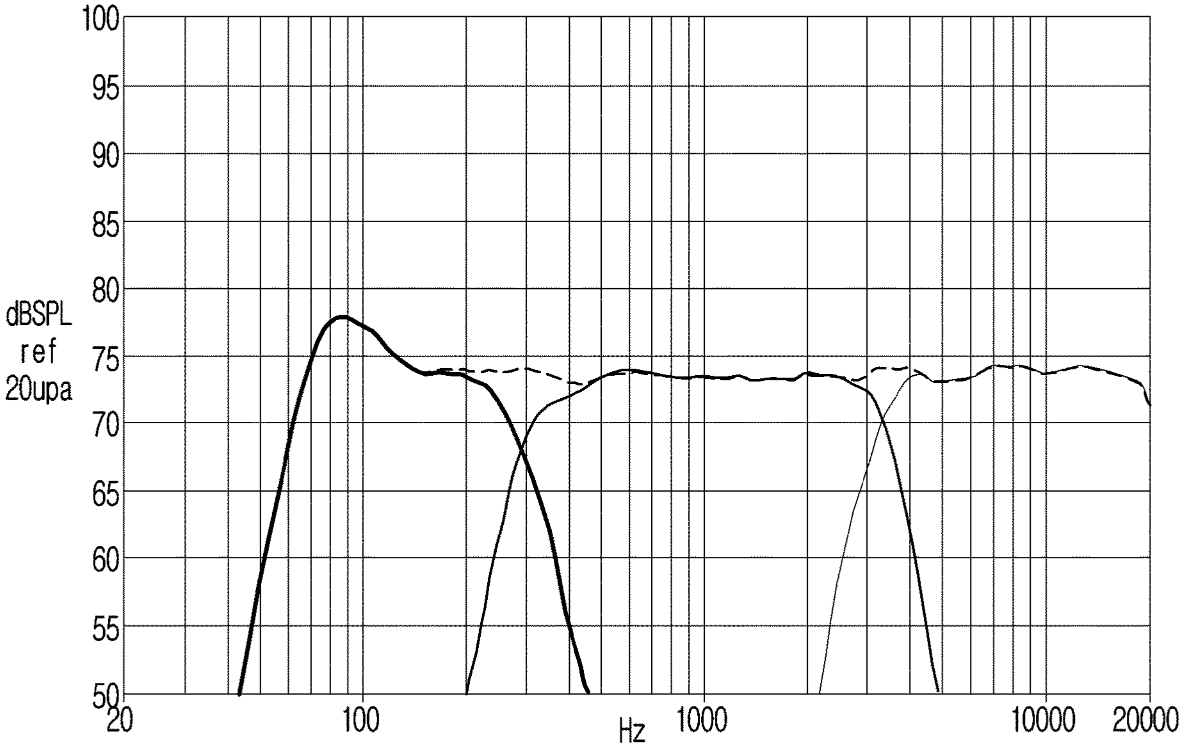
FIG. 5A is a graph illustrating an example sound signal output in a display mode according to various embodiments.
Figure 5B:
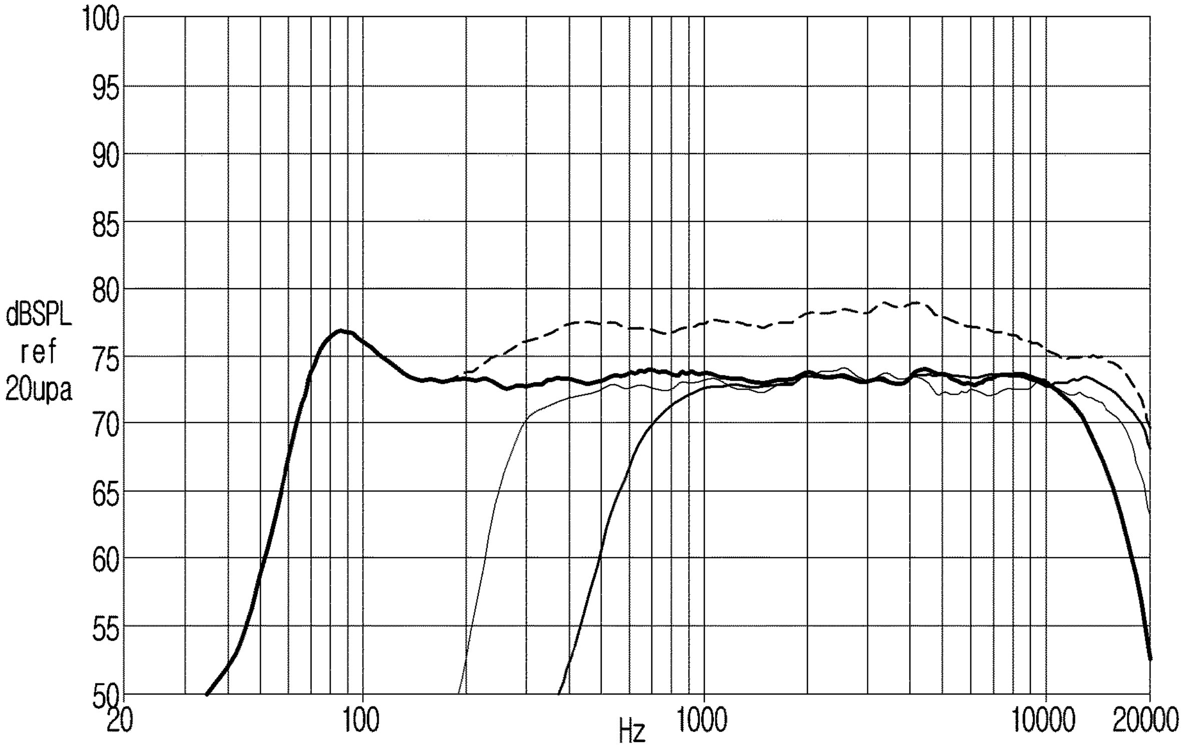
FIG. 5B is a graph illustrating an example sound signal processed in a center speaker mode according to various embodiments.
Figure 5C:
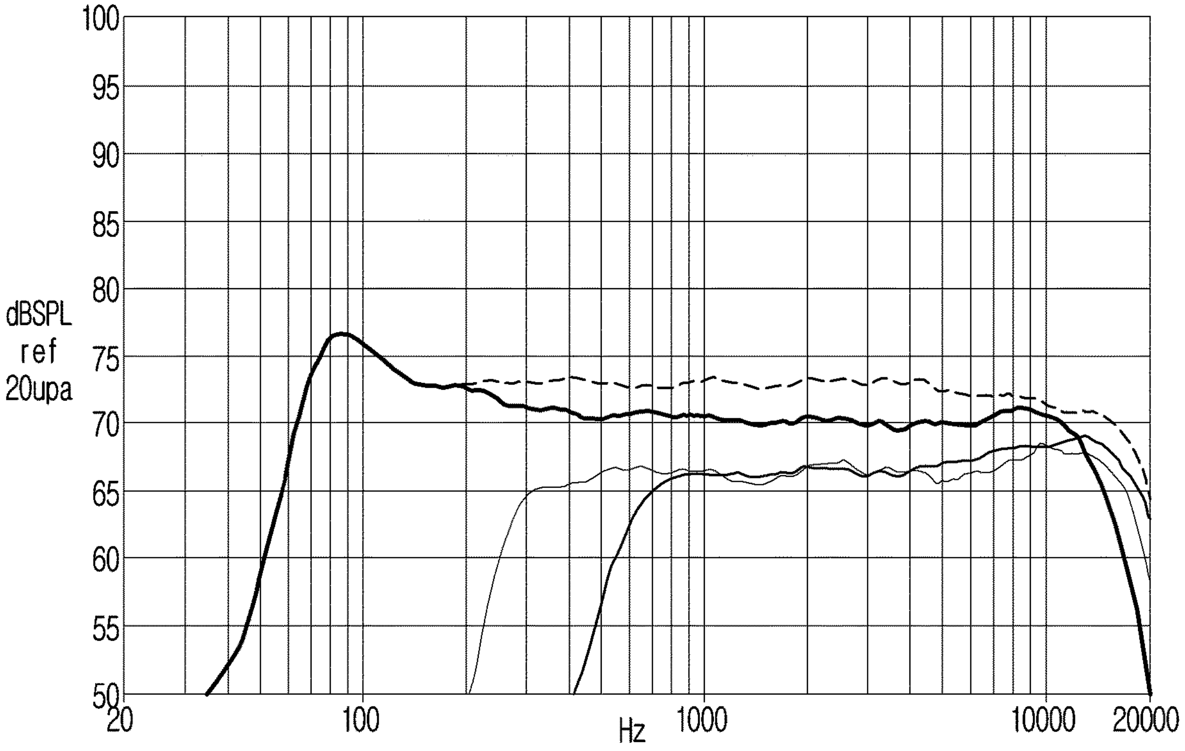
FIG. 5C is a graph illustrating an example sound signal output in the center speaker mode according to various embodiments.

FIG. 5A is a graph illustrating an example sound signal output in a display mode according to various embodiments, FIG. 5B is a graph illustrating an example sound signal processed in a center speaker mode according to various embodiments, and FIG. 5C is a graph illustrating an example sound signal output in the center speaker mode according to various embodiments. The description will be made in greater detail below with reference to FIGS. 5A, 5B and 5C.

Referring to FIG. 5A, an example of sound signals of three channels is illustrated. The channels of three sound signals may be a low-band (low frequency band) channel, a middle-band (middle frequency band) channel, and a high-band (high frequency band) channel. In an embodiment, the low frequency band may be a band of approximately 20 Hz to 300 Hz, the middle frequency band channel may be a band of approximately 300 Hz to 3 kHz, and the high frequency band channel may be a band of approximately 3 kHz to 20 kHz. However, the bands described above are merely an example and boundaries of the frequency bands may be variously defined according to acoustic contents, specifications of speakers, and the like.

In a case of the display mode, the three sound signals may be processed and output to the corresponding speakers, respectively. For example, the sound signal of the low band channel may be output to a woofer speaker, the sound signal of the middle band channel may be output to a center speaker, and the sound signal of the high band channel may be output to right and left speakers. A dotted line indicates a sum of the sound signals of all channels and the user may listen the sound signal shown with the dotted line.

Referring to FIG. 5B, sound signals with extended bandwidths of the sound signals of FIG. 5A are illustrated. In a case of the center speaker mode, all speakers of the display apparatus may operate as the center speaker. Accordingly, the sound signals of the low band channel, the middle band channel, and the high band channel may be extended. When the bandwidth of the sound signal of each channel is extended, the sum of the sound signals of all channels may have the gain increased than the dotted line illustrated in FIG. 5A in the middle band and the high band, as a dotted line illustrated in FIG. 5B. Accordingly, a total sum of the sound signals with the extended bandwidth may not be balanced. Accordingly, the display apparatus may perform correction of reducing the gain of the middle frequency band and the high frequency band of the sound signal with the extended bandwidth. FIG. 5C illustrates the sound signal with reduced gain of the middle frequency band and the high frequency band. Accordingly, referring to the dotted line illustrated in FIG. 5C, the sum of all sound signals may become similar to the dotted line illustrated in FIG. 5A, thereby maintaining the balance of the sound signals.

Figure 6:
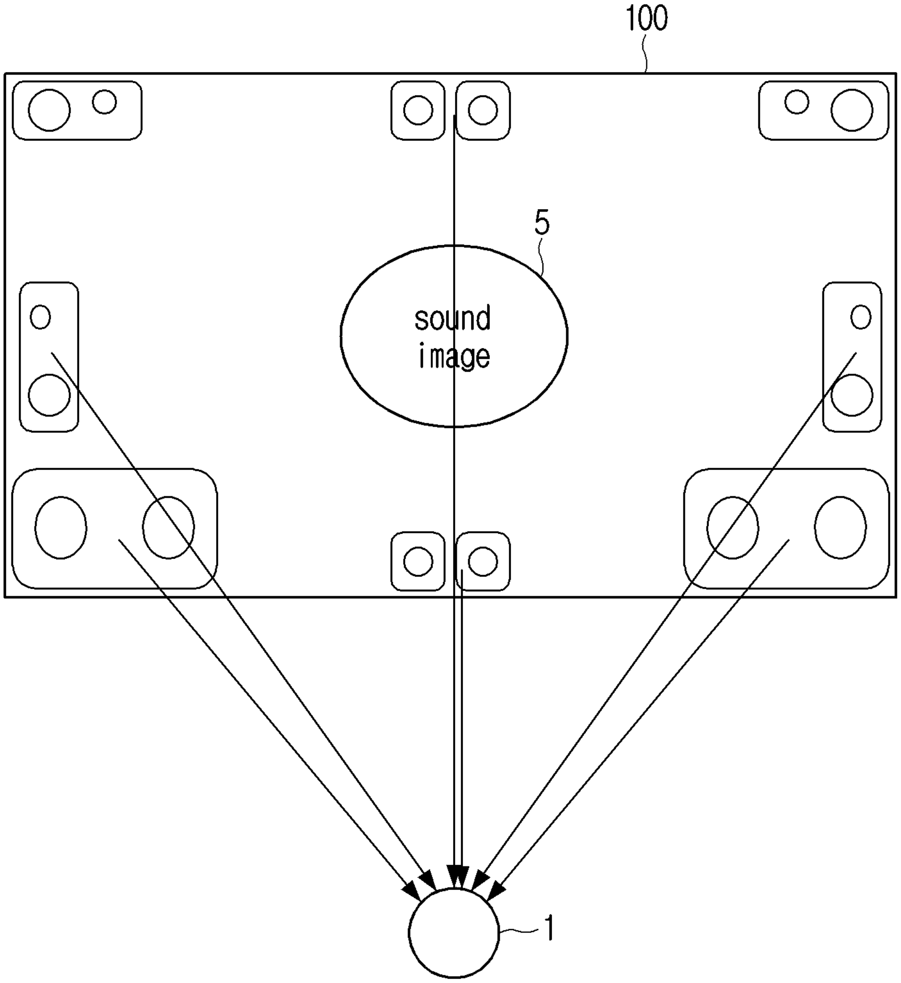
FIG. 6 is a diagram illustrating an example sound image formed in the center speaker mode according to various embodiments.

FIG. 6 is a diagram illustrating an example sound image formed in the center speaker mode according to various embodiments.

Referring to FIG. 6, the display apparatus 100 may include a plurality of speakers. For example, the plurality of speakers may be disposed in a left area, a center area, and a right area of the display apparatus 100. The left area may include an upper left area, a middle left area, and a lower left area of the display apparatus. The center area may include an upper middle area and a lower middle area of the display apparatus. The right area may include an upper right area, a middle right area, and a lower right area of the display apparatus.

When the display apparatus 100 operates in the center speaker mode, the display apparatus 100 may apply the PEQ for the center speaker mode to the sound signal of each input channel. For example, the PEQ for the center speaker mode may include the delay of each sound signal of the plurality of channels, the gain adjustment, and the function of applying the weight set to the predetermined frequency band (or set value). In addition, the PEQ for the center speaker mode may include a tuning value and the like for processing the sound signal of the channel output to each internal speaker based on information on the number and the locations of the disposed internal speakers, a distance between speakers, and the like. The display apparatus 100 may extend the bandwidth of each channel of the sound signal based on the PEQ for the center speaker mode, reduce the gain of the sound signal of the low and high band, and apply the tuning value of the sound signal of each channel, thereby forming a sound image 5 in the center area of the display. In other words, normally, a user 1 watches a content or listen to a sound in the center area of the display, and accordingly, the tuning value of the PEQ for the center speaker mode may be set so that the sound image 5 is formed in the center area of the display.

The arrangement, the number, and the like of the internal speakers of the display apparatus 100 may be diverse as illustrated and described below with reference to FIGS. 7A, 7B, 7C, 7D and 7E.

FIGS. 7A, 7B, 7C, 7C and 7E are diagrams illustrating example arrangements of speakers according to various embodiments. FIGS. 7A, 7B, 7C, 7D and 7E illustrate the arrangement of the speakers of the display apparatus 100 for convenience, but the speakers may be disposed on a rear surface of the display apparatus 100.

Figure 7A:
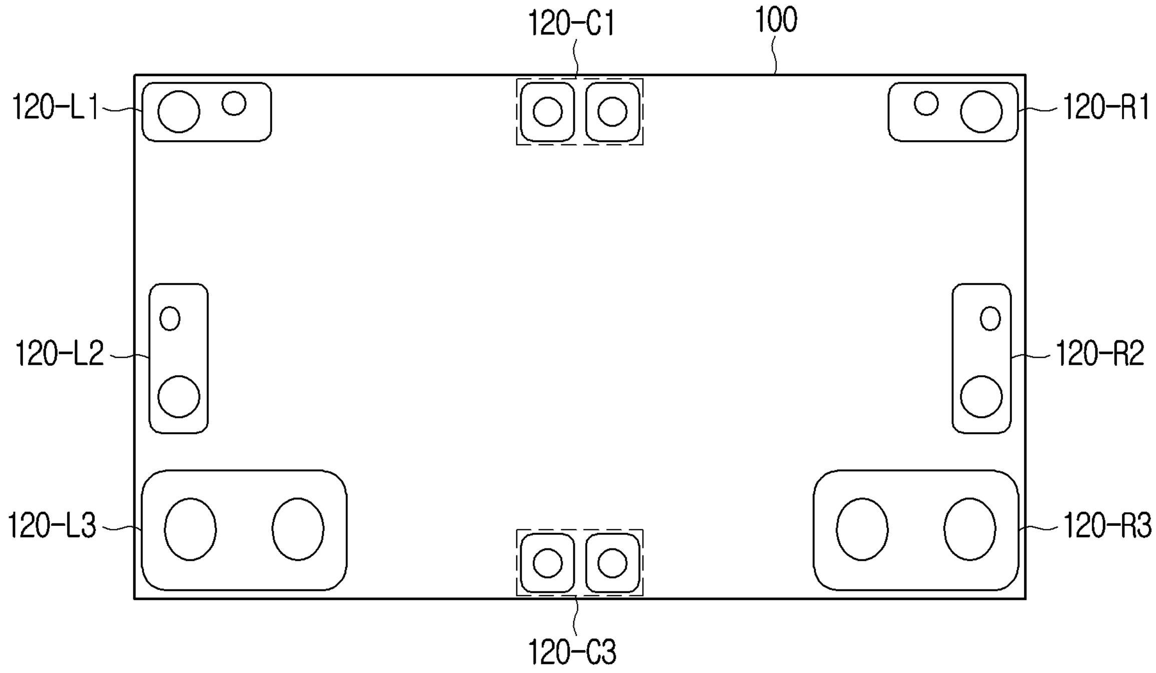
FIGS. 7A, 7B, 7C, 7D and 7E are diagrams illustrating example arrangements of speakers according to various embodiments.

Referring to FIG. 7A, the speakers may be disposed in an upper left area 120-L1, middle left area 120-L2, lower left area 120-L3, an upper center area 120-C1, a lower center area 120-C3, and an upper right area 120-R1, a middle right area 120-R2, and a lower right area 120-R3 of the display apparatus 100.

When the speakers are arranged as in FIG. 7A, the speaker in the middle left area 120-L2, the speaker in the lower left area 120-L3, the speaker in the middle right area 120-R2, and the speaker in the lower right area 120-R3 may be the main speakers to be a reference of basic acoustic performance. As descried above, the location of the sound image may vary depending on the location of the user. Accordingly, the display apparatus may minimize or reduce the location change of the sound image depending on the location change of the user, by outputting volumes (gains) of the speaker in the upper center area 120-C1 and the lower center area 120-C3 to be higher than those of other speakers.

In addition, the display apparatus may form the location of the sound image in the center area of the display by applying the volume, the delay, and the high frequency weight of the speaker in the upper left area 120-L1 and the speaker in the upper right area 120-R1.

Figure 7B:
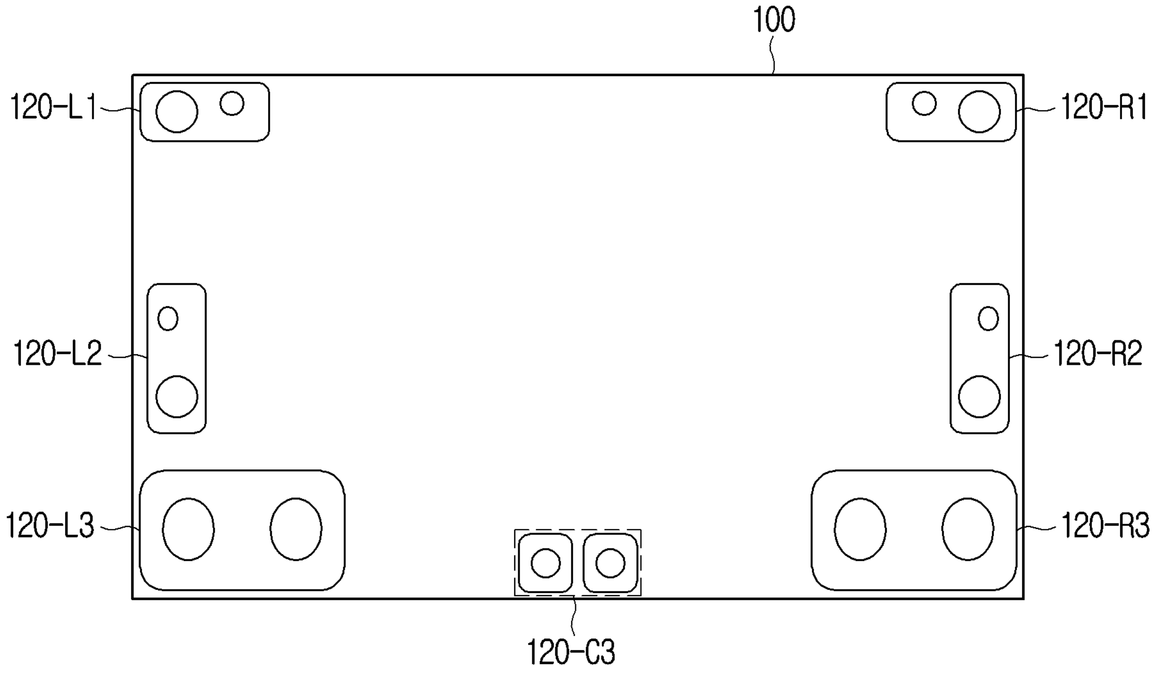

Referring to FIG. 7B, the speakers may be disposed in the upper left area 120-L1, the middle left area 120-L2, the lower left area 120-L3, the lower center area 120-C3, the upper right area 120-R1, the middle right area 120-R2, and the lower right area 120-R3 of the display apparatus 100.

When the speakers are disposed as in FIG. 7B, the speaker in the middle left area 120-L2, the speaker in the lower left area 120-L3, the speaker in the middle right area 120-R2, and the speaker in the lower right area 120-R3 may be the main speakers to be a reference of basic acoustic performance. The display apparatus may minimize or reduce the location change of the sound image depending on the location change of the user by outputting the volume of the speaker in the lower center area 120-C3 to be higher than those of other speakers.

In addition, the display apparatus may form the location of the sound image in the center area of the display by applying the volume, the delay, and the high frequency weight of the speaker in the upper left area 120-L1 and the speaker in the upper right area 120-R1.

Figure 7C:
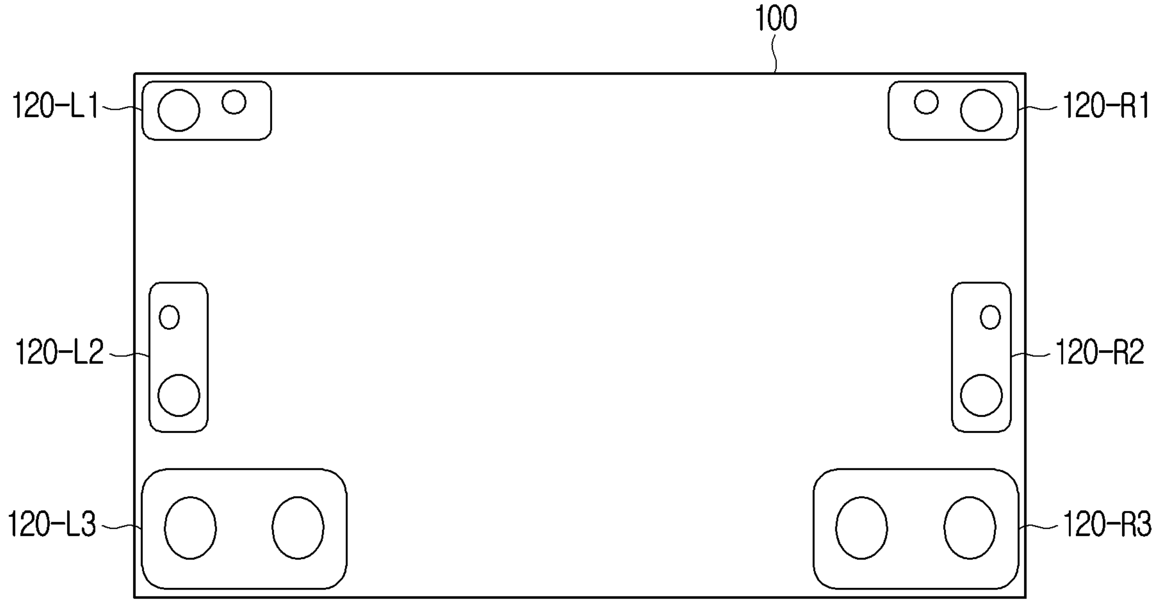

Referring to FIG. 7C, the speakers may be disposed in the upper left area 120-L1, the middle left area 120-L2, the lower left area 120-L3, the upper right area 120-R1, the middle right area 120-R2, and the lower right area 120-R3 of the display apparatus 100.

When the speakers are disposed as in FIG. 7C, the speaker in the middle left area 120-L2, the speaker in the lower left area 120-L3, the speaker in the middle right area 120-R2, and the speaker in the lower right area 120-R3 may be the main speakers to be a reference of basic acoustic performance.

The display apparatus may form the location of the sound image in the center area of the display by applying the volume, the delay, and the high frequency weight of the speaker in the upper left area 120-L1 and the speaker in the upper right area 120-R1.

In addition, the display apparatus may perform low pass filtering of the sound signal output to the speaker in the middle left area 120-L2 and the speaker in the middle right area 120-R2 and apply the predetermined weight to the low frequency and middle frequency bands, thereby preventing and/or reducing a deterioration in the high frequency band. Accordingly, the sound signal output to the speaker in the middle left area 120-L2 and the speaker in the middle right area 120-R2 may contribute only to the acoustic enhancement of the all sound signals.

Figure 7D:
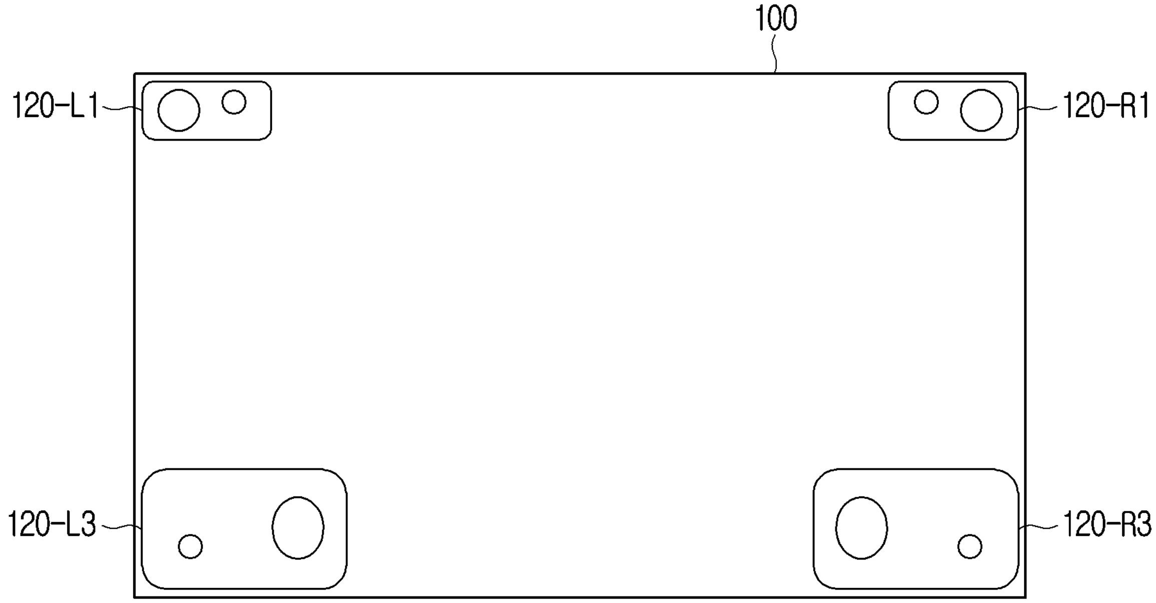

Referring to FIG. 7D, the speakers may be disposed in the upper left area 120-L1, the lower left area 120-L3, the upper right area 120-R1, and the lower right area 120-R3 of the display apparatus 100.

When the speakers are disposed as in FIG. 7D, the speaker in the low left area 120-L3 and the speaker in the lower right area 120-R3 may be the main speakers to be a reference of basic acoustic performance Since the main speakers are located in the lower area of the display apparatus 100, the sound image may be formed in the lower area of the display. Accordingly, the display apparatus may form the location of the sound image in the center area of the display by applying the volume, the delay, and the high frequency weight of the speaker in the upper left area 120-L1 and the speaker in the upper right area 120-R1.

Figure 7E:
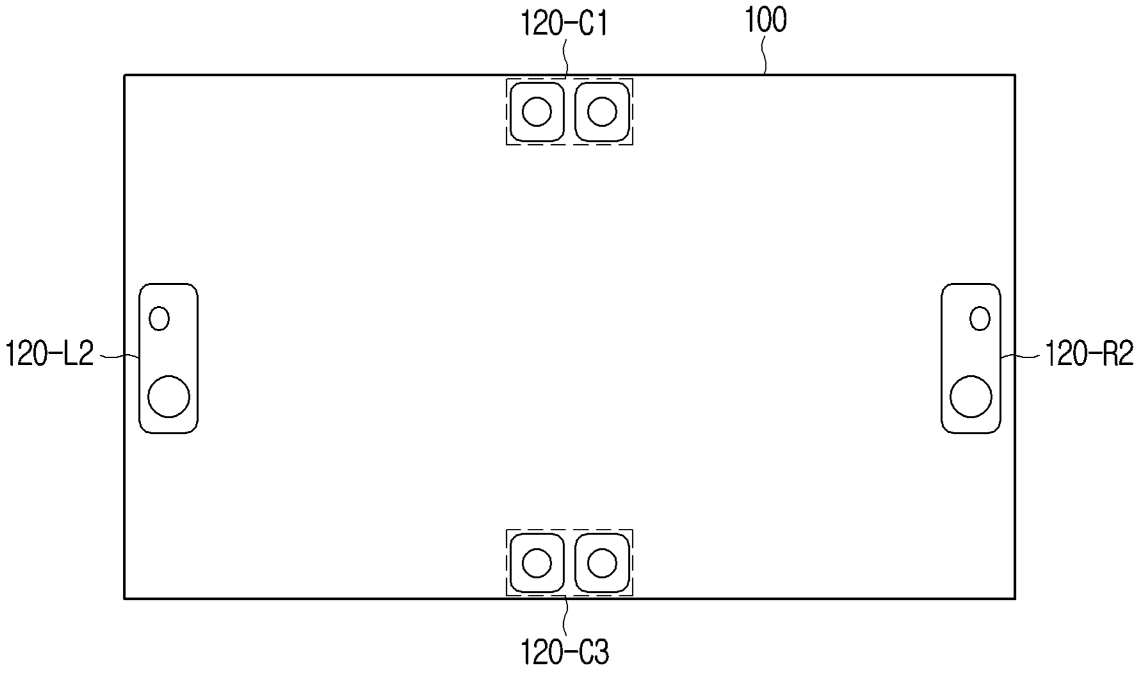

Referring to FIG. 7E, the speakers may be disposed in the middle left area 120-L2, the upper center area 120-C1, the lower center area 120-C3, and the middle right area 120-R2 of the display apparatus 100.

When the speakers are disposed as in FIG. 7E, the speaker in the middle left area 120-L2 and the speaker in the middle right area 120-R2 may be the main speakers to be a reference of basic acoustic performance. The display apparatus may minimize or reduce the location change of the sound image depending on the location change of the user by outputting the volume (gain) of the speaker in the upper center area 120-C1 and the speaker in the lower center area 120-C3 to be higher than those of other speakers. In addition, the display apparatus may form the location of the sound image in the center area of the display by applying the volume, the delay, and the high frequency weight of the speaker in the middle left area 120-L2 and the speaker in the middle right area 120-R2.

In other words, when the center speakers are disposed in the center area, the display apparatus 100 may minimize or reduce the change of the sound image by increasing and outputting the gain of the sound signal of the channel output to the center speakers to be higher than that of sound signals of the channels output to the speakers disposed in the other areas based on the PEQ for the center speaker mode. When the speakers are disposed in the lower area and the upper area of the display apparatus, the display apparatus 100 may delay and output the sound signal of the channel output to the speaker disposed in the lower area. Alternatively, the display apparatus 100 may increase and output the gain of the sound signal of the channel output to the speaker disposed in the upper area. The display apparatus 100 may output the sound signal by applying the weight set to the high frequency band of the channel output to the speaker disposed in the upper area. Accordingly, the display apparatus 100 may form the sound image in the center area of the display.

In addition, when the speakers are disposed in the lower area and the upper area of the display apparatus, the display apparatus 100 may output the sound signal by applying the weight set to the low frequency and middle frequency band of the channel output to the speaker disposed in the upper area. Accordingly, the display apparatus may prevent and/or reduce a deterioration of the sound signal in the high frequency band.

The user may be located in the left or right area instead of the center area of the display. In this case, the display apparatus 100 may correct the location where the sound image is formed.

Figure 8:
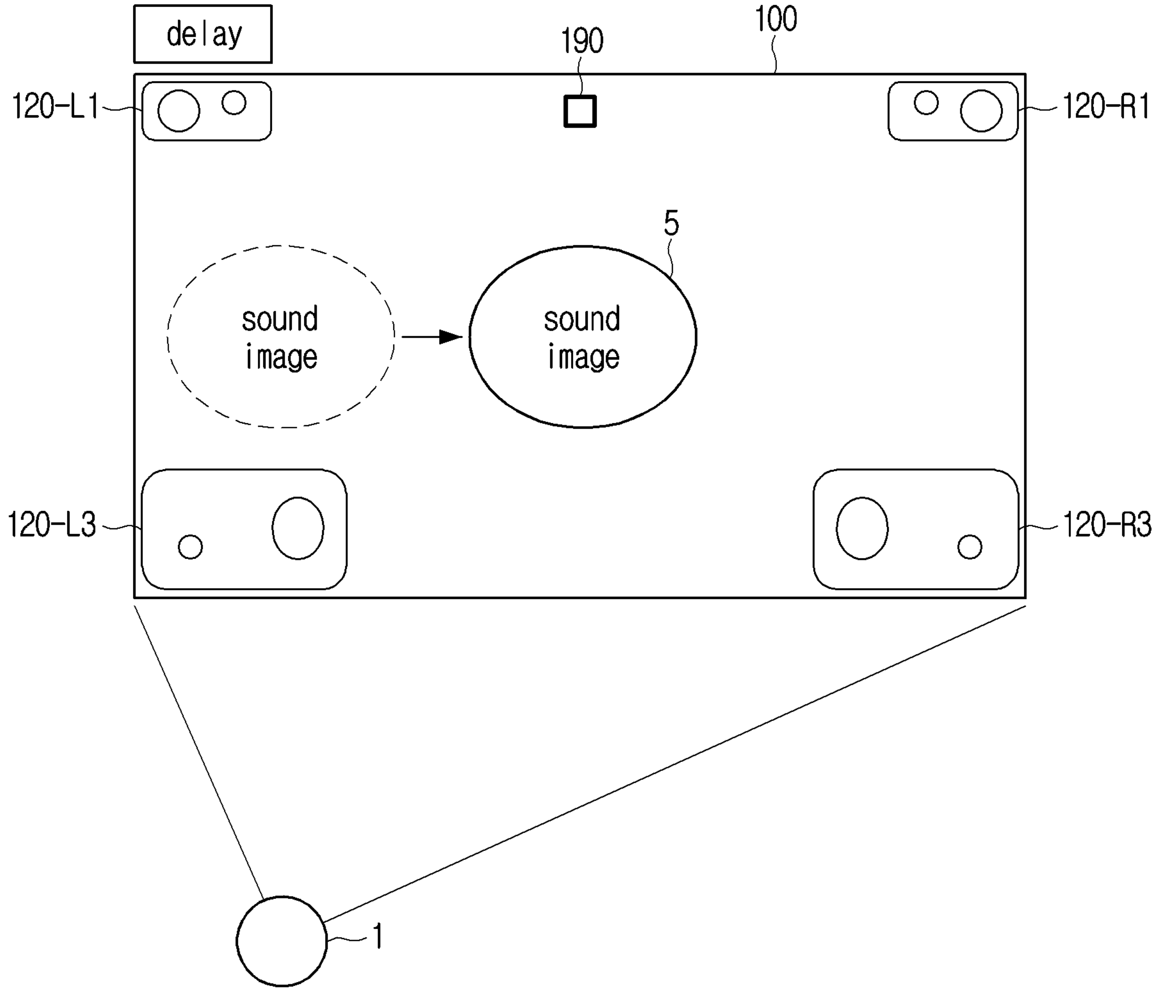
FIG. 8 is a diagram illustrating an example process of correcting an area in which the sound image is formed by delaying the sound signal according to various embodiments.

FIG. 8 is a diagram illustrating an example process of correcting an area in which the sound image is formed by delaying the sound signal according to various embodiments.

Referring to FIG. 8, the user 1 is located in the left area of the display apparatus 100. Referring to FIG. 8, the speakers may be disposed in the upper left area 120-L1, the lower left area 120-L3, the upper right area 120-R1, and the lower right area 120-R3 of the display apparatus 100. The arrangement and the number of the speakers illustrated in FIG. 8 are an embodiment and the display apparatus 100 may include various number of speakers and the speakers disposed at various locations.

The user 1 may be located in the left area of the display apparatus 100. In this case, the user 1 may recognize that the sound image is formed in the left area of the display apparatus 100.

The sensor 190 may detect the location of the user. When the display apparatus 100 detects that the user is located in the left area of the display apparatus 100, the display apparatus 100 may form a sound image 5 recognized by the user in the center area of the display apparatus 100 by adjusting the output sound signal. For example, the display apparatus 100 may delay and output the sound signal output from the speakers disposed in the upper left are 120-L1 and the lower left area 120-L3. In this case, the user 1 located in the left area may recognize that the image sound 5 is formed in the center area of the display apparatus 100.

In other words, the display apparatus 100 may detect the location of the user 1 using the sensor 190. The display apparatus 100 may correct the location where the sound image 5 is formed by delaying and outputting the sound signal of the channel output to the speaker disposed in an area corresponding to the location of the user 1 among the left area and the right area based on the detected location of the user 1.

Figure 9:
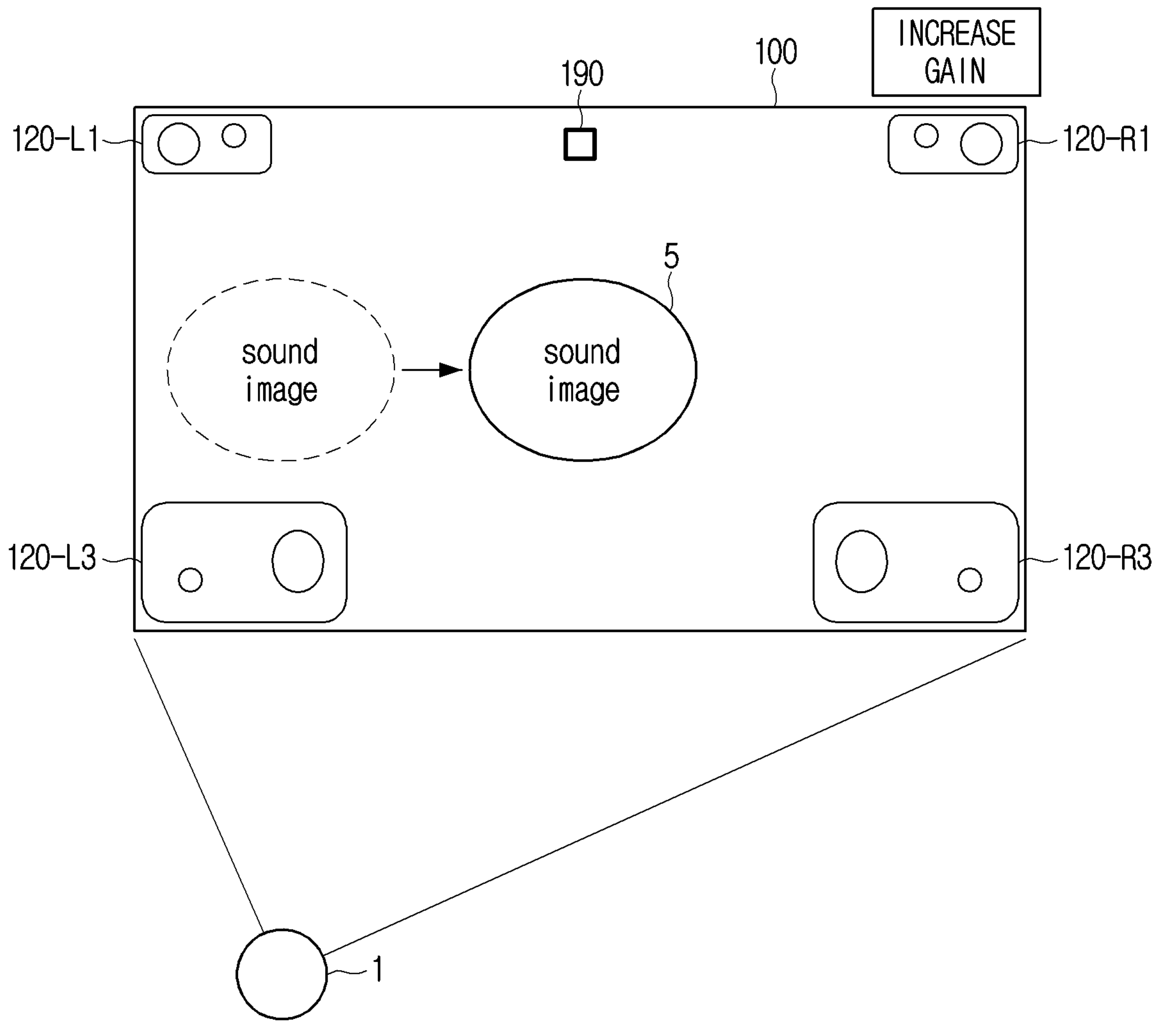
FIG. 9 is a diagram illustrating an example process of correcting the area in which the sound image is formed by increasing a gain of the sound signal according to various embodiments.

FIG. 9 is a diagram illustrating an example process of correcting the area in which the sound image is formed by increasing a gain of the sound signal according to various embodiments.

Referring to FIG. 9, the display apparatus 100 with the same or similar number and arrangement of the speakers as those in FIG. 8 and the user 1 located in the left area of the display apparatus 100 are illustrated.

When the display apparatus 100 detects that the user is located in the left area of the display apparatus 100, the display apparatus 100 may form the sound image 5 recognized by the user in the center area of the display apparatus 100 by adjusting the output sound signal. For example, the display apparatus 100 may output the sound signal by increasing the gain of the sound signal output from the speakers disposed in the upper right area 120-R1 and the lower right area 120-R3. In this case, the user 1 located in the left area may recognize that the sound image 5 is formed in the center area of the display apparatus 100.

In other words, the display apparatus 100 may correct the area in which the sound image 5 of the sound signal is formed by increasing and outputting the gain of the sound signal of the channel output to the speaker disposed in an area farthest away from the detected location of the user 1.

Figure 10:
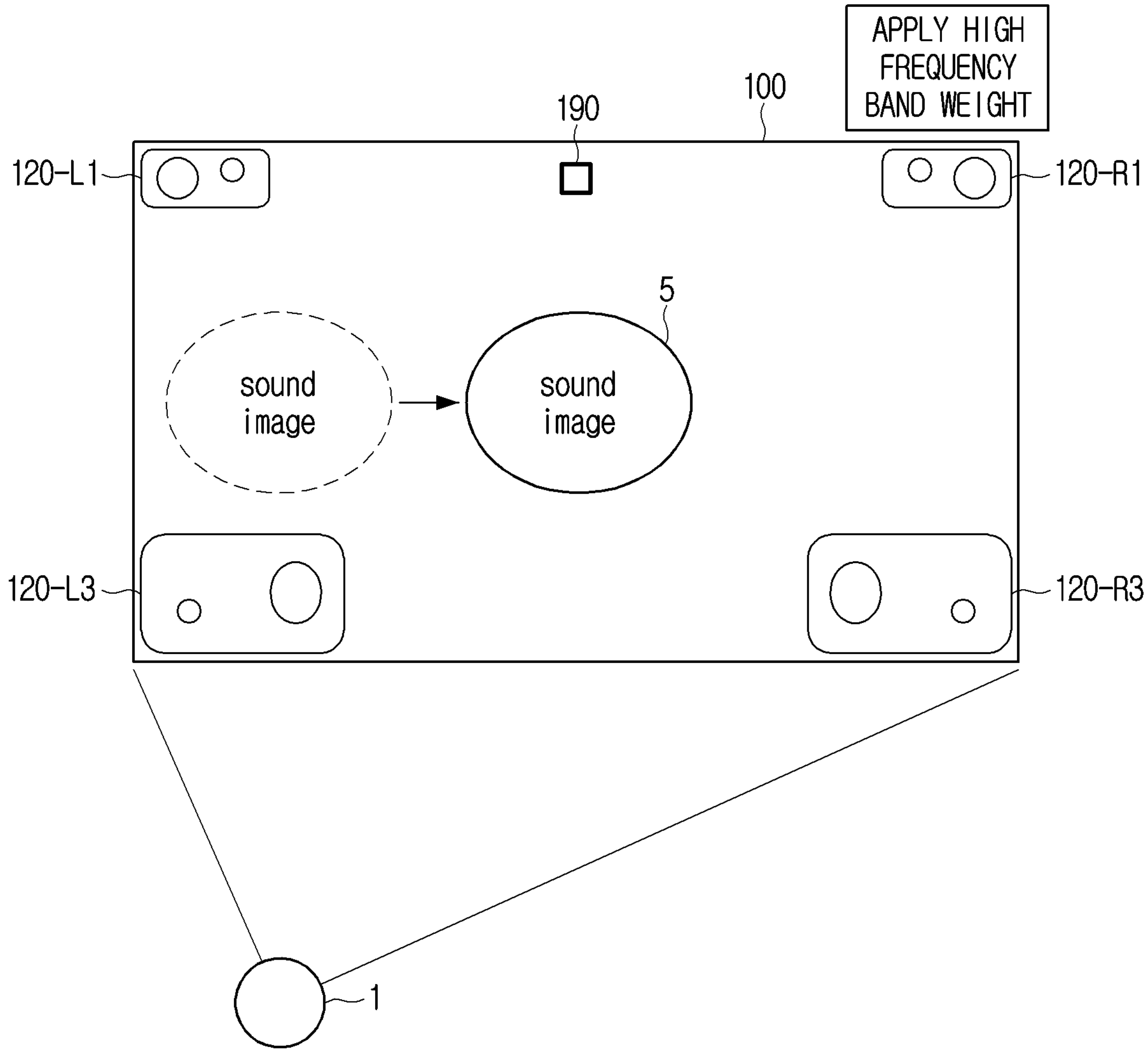
FIG. 10 is a diagram illustrating an example process of correcting the area in which the sound image is formed by applying a weight of a frequency band of the sound signal according to various embodiments.

FIG. 10 is a diagram illustrating an example process of correcting the area in which the sound image is formed by applying a weight of a frequency band of the sound signal according to various embodiments.

When the display apparatus 100 detects that the user is located in the left area of the display apparatus 100, the display apparatus 100 may form the sound image 5 recognized by the user in the center area of the display apparatus 100 by adjusting the output sound signal. For example, the display apparatus 100 may output the sound signal by applying the weight set to the high frequency band of the channel output from the speaker disposed in the upper right area 120-R1 and the lower right area 120-R3. In this case, the user 1 located in the left area may recognize that the sound image 5 is formed in the center area of the display apparatus 100.

In other words, the display apparatus 100 may correct the area in which the sound image 5 of the sound signal is formed by outputting the sound signal by applying the weight set to the high frequency band of the channel output to the speaker disposed in the area farthest away from the detected location of the user 1.

Hereinabove, various example embodiments in which the display apparatus 100 operates in the center speaker mode have been described. Hereinafter, a method for controlling the display apparatus will be described in greater detail with reference to FIG. 11.

Figure 11:
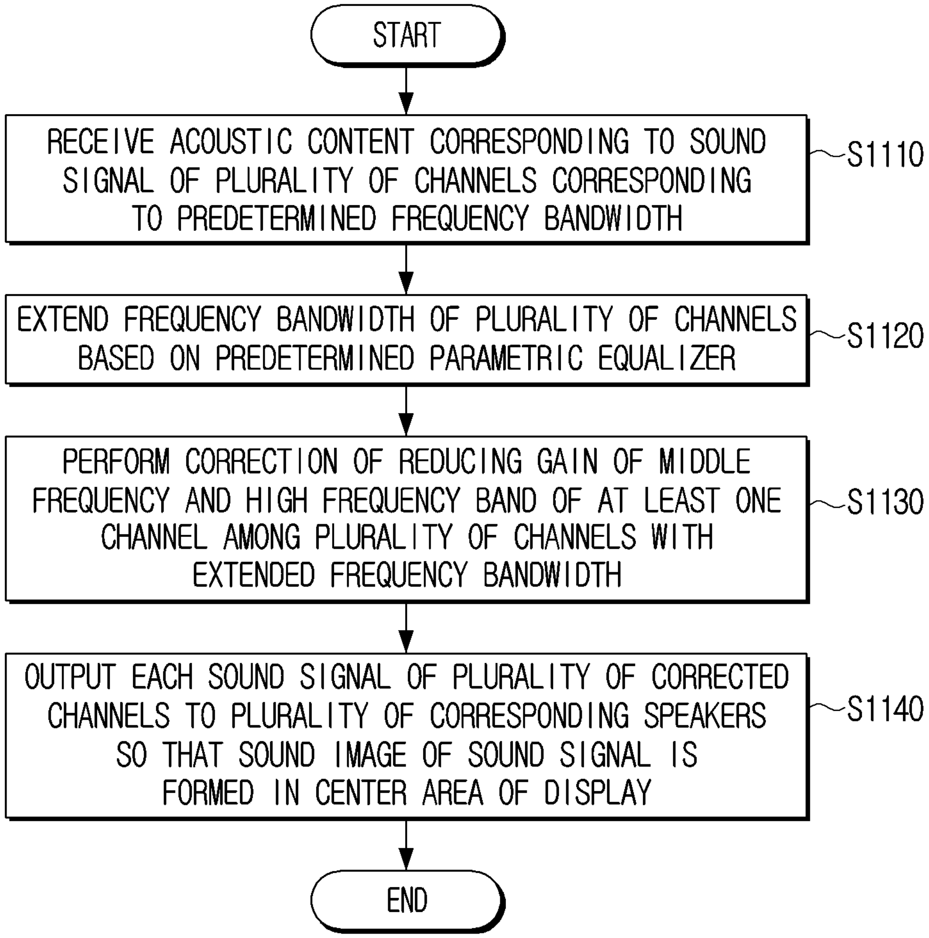
FIG. 11 is a flowchart illustrating an example method of controlling the display apparatus according to various embodiments.

FIG. 11 is a flowchart illustrating an example method of controlling the display apparatus according to various embodiments.

Referring to FIG. 11, the display apparatus may receive an acoustic content corresponding to a sound signal of a plurality of channels corresponding to a predetermined (e.g., specified) frequency bandwidth (S1110). For example, the acoustic content may be included in the AV content together with the image content. The display apparatus may receive the AV content.

The display apparatus may extend the frequency bandwidth of the plurality of channels based on a predetermined (e.g., specified) PEQ (S1120). The display apparatus may operate in the center speaker mode in association with the external audio system. Accordingly, the predetermined PEQ may be a PEQ for the center speaker mode. For example, the predetermined PEQ may include the delay of each sound signal of the plurality of channels, the gain adjustment, and the function of applying the weight set to the predetermined frequency band (or set value).

The display apparatus may perform the correction of reducing the gain of the middle frequency and high frequency band of at least one channel among the plurality of channels with the extended frequency bandwidth (S1130). The display apparatus may output each sound signal of the plurality of corrected channels to the plurality of corresponding speakers so that the sound image of the sound signal is formed in the center area of the display (S1140).

When the center speaker is disposed in the center area, the display apparatus may output the sound signal by increasing the gain of the sound signal of the channel output to the center speaker to be higher than the sound signal of the channel output to the speaker disposed in the other areas based on the predetermined PEQ. When the speakers are disposed in the lower area and the upper area of the display apparatus, the display apparatus may delay and output the sound signal of the channel output to the speaker disposed in the lower area based on the predetermined PEQ. The display apparatus may output the sound signal by increasing the gain of the sound signal of the channel output to the speaker disposed in the upper area. The display apparatus may output the sound signal by applying the weight set to the high frequency band of the channel output to the speaker disposed in the upper area. Accordingly, the display apparatus may form the sound image in the center area of the display based on the user who is located in the center area of the display.

When the speaker is disposed in the lower area and the upper area, the display apparatus may output the sound signal by applying the weight set to the low frequency and middle frequency bands of the channel output to the speaker disposed in the upper area based on the predetermined PEQ. Accordingly, the display apparatus may prevent and/or reduce a deterioration of the output sound signal in the high frequency band.

If the user is not located in the center area of the display, the display apparatus may correct the location where the sound image is formed. The display apparatus may detect the location of the user. The display apparatus may delay and output the sound signal of the channel output to the speaker disposed in the area corresponding to the location of the user among the left area and the right area based on the detected location of the user. The display apparatus may output the sound signal by increasing the gain of the sound signal of the channel output to the speaker disposed in the area farthest away from the detected location of the user or output the sound signal by applying the weight set to the high frequency band of the channel output tot eh speaker disposed in the area farthest away from the detected location of the user. Accordingly, the display apparatus may correct the location where the sound image is formed and the user who is located in one area may always recognize that the sound image is formed in the center area of the display.

The method for controlling the display apparatus according to the various embodiments may be provided as a computer program product. The computer program product may include an S/W program or a non-transitory computer readable medium storing the S/W program.

The non-transitory computer-readable medium may refer to a medium that semi-permanently stores data and is readable by a machine. For example, the various applications or programs described above may be stored and provided in the non-transitory computer-readable medium such as a CD, a DVD, a hard disk drive, a Blu-ray disc, a USB, a memory card, and a ROM.

While various example embodiments of the disclosure have been shown and described, the disclosure is not limited to the aforementioned example embodiments, and it will be apparent to those skilled in the art that various modifications can be made, without departing from the gist of the disclosure, including the appended claims. It will also be understood that any of the embodiment(s) described herein may be used in conjunction with any other embodiment(s) described herein.

What is claimed is:

1. A display apparatus comprising:

a communication interface comprising communication circuitry;

a display;

a plurality of speakers; and a processor, wherein the processor is configured to:

control the communication interface to receive an acoustic content corresponding to a sound signal of a plurality of channels corresponding to a specified frequency bandwidth;

extend a frequency bandwidth of at least one channel of the plurality of channels based on a specified parametric equalizer (PEQ);

perform correction of reducing a gain in middle frequency and high frequency bands of at least one channel of the plurality of channels with the extended frequency bandwidth; and output each sound signal of the plurality of corrected channels to the plurality of corresponding speakers so that a sound image of the sound signal is formed in a center area of the display.

2. The display apparatus according to claim 1, wherein the parametric equalizer comprises at least one of: a delay of each sound signal of the plurality of channels, gain adjustment, and applying a weight set to a predetermined frequency band.

3. The display apparatus according to claim 2, wherein the plurality of speakers are disposed in at least one area of a left area, a center area, and a right area of the display apparatus, and wherein the left area comprises an upper left area, a middle left area, and a lower left area of the display apparatus, the center area comprises an upper center area and a lower center area of the display apparatus, and the right area comprises an upper right area, a middle right area, and a lower right area of the display apparatus.

4. The display apparatus according to claim 3, wherein the processor is configured to: based on a center speaker being disposed in the center area, outputting a sound signal by increasing a gain of a sound signal of a channel output to the center speaker to be greater than a gain of a sound signal of a channel output to speakers disposed in other areas based on the parametric equalizer.

5. The display apparatus according to claim 3, wherein the processor is configured to: based on speakers being disposed in a lower area and an upper area of the display apparatus, delay and output a sound signal of a channel output to the speaker disposed in the lower area based on the parametric equalizer, and form a sound image of the sound signal in the center area of the display.

6. The display apparatus according to claim 4, wherein the processor is configured to: output a sound signal by increasing a gain of the sound signal of a channel output to a speaker disposed in the upper area based on the parametric equalizer, and form a sound image of the sound signal in the center area of the display.

7. The display apparatus according to claim 4, wherein the processor is configured to: output the sound signal by applying a weight set to a high frequency band of a channel output to a speaker disposed in the center area based on the parametric equalizer, and form a sound image of the sound signal in the center area of the display.

8. The display apparatus according to claim 3, wherein the processor is configured to: based on speakers being disposed in a lower area and an upper area of the display, output a sound signal by applying a weight set to low frequency and middle frequency bands of a channel output to a speaker disposed in the upper area based on the parametric equalizer, and prevent or reduce a deterioration of the sound signal in a high frequency band.

9. The display apparatus according to claim 3, further comprising:

a sensor configured to detect a location of a user, wherein the processor is configured to: based on the detected location of the user, delay and output a sound signal of a channel output to a speaker disposed in an area corresponding to the location of the user among the left area and the right area and correct an area in which the sound image of the sound signal is formed.

10. The display apparatus according to claim 9, wherein the processor is configured to: output a sound signal by increasing a gain of the sound signal of a channel output to a speaker disposed in an area farthest away from the detected location of the user and correct an area in which the sound image of the sound signal is formed.

11. The display apparatus according to claim 9, wherein the processor is configured to: output the sound signal by applying a weight set to a high frequency band of a channel output to a speaker disposed in an area farthest away from the detected location of the user, and correct an area in which the sound image of the sound signal is formed.

12. A method for controlling a display apparatus, the method comprising:

receiving an acoustic content corresponding to a sound signal of a plurality of channels corresponding to a specified frequency bandwidth;

extending a frequency bandwidth of the plurality of channels based on a specified parametric equalizer (PEQ);

performing correction of reducing a gain in middle frequency and high frequency bands of at least one channel of the plurality of channels with the extended frequency bandwidth; and outputting each sound signal of the plurality of corrected channels to the plurality of corresponding speakers so that a sound image of the sound signal is formed in a center area of the display.

13. The method for controlling a display apparatus according to claim 12, wherein the parametric equalizer comprises at least one of: a delay of each sound signal of the plurality of channels, gain adjustment, and applying a weight set to a predetermined frequency band.

14. The method for controlling a display apparatus according to claim 13, wherein the outputting to the plurality of speakers comprises: based on a center speaker being disposed in a center area of the display apparatus, outputting a sound signal by increasing a gain of a sound signal of a channel output to the center speaker to be greater than a gain of a sound signal of a channel output to speakers disposed in other areas based on the parametric equalizer.

15. The method for controlling a display apparatus according to claim 13, wherein the outputting to the plurality of speakers comprises: based on speakers being disposed in a lower area and an upper area of the display apparatus, delaying and outputting a sound signal of a channel output to the speaker disposed in the lower area based on the parametric equalizer.

16. The method for controlling a display apparatus according to claim 15, wherein the outputting to the plurality of speakers comprises: outputting a sound signal by increasing a gain of the sound signal of a channel output to a speaker disposed in the upper area based on the parametric equalizer.

17. The method for controlling a display apparatus according to claim 15, wherein the outputting to the plurality of speakers comprises: outputting the sound signal by applying a weight set to a high frequency band of a channel output to a speaker disposed in the center area based on the parametric equalizer.

18. The method for controlling a display apparatus according to claim 13, wherein the outputting to the plurality of speakers comprises: based on speakers being disposed in a lower area and an upper area of the display, outputting a sound signal by applying a weight set to low frequency and middle frequency bands of a channel output to a speaker disposed in the upper area based on the parametric equalizer, and prevent or reduce a deterioration of the sound signal in a high frequency band.

19. The method for controlling a display apparatus according to claim 12, further comprising:

detecting a location of a user;

based on the detected location of the user, delaying and outputting a sound signal of a channel output to a speaker disposed in an area corresponding to the location of the user among a left area and a right area of the display apparatus and correcting an area in which the sound image of the sound signal is formed.

20. The method for controlling a display apparatus according to claim 19, wherein the correcting an area in which the sound image of the sound signal is formed comprises: outputting a sound signal at least one of by increasing a gain of the sound signal of a channel output to a speaker disposed in an area farthest away from the detected location of the user and by applying a weight set to a high frequency band of a channel output to a speaker disposed in an area farthest away from the detected location of the user, and correcting an area in which the sound image of the sound signal is formed.

* * * * *